United States Patent
Agevik et al.

(10) Patent No.: US 7,948,246 B2
(45) Date of Patent: May 24, 2011

(54) ELECTRONIC DEVICE UTILIZING IMPEDANCE AND/OR RESISTANCE IDENTIFICATION TO IDENTIFY AN ACCESSORY DEVICE

(75) Inventors: Markus Gustav Agevik, Malmo (SE); David Johansson, Malmo (SE); Anders Lundquist, Malmo (SE); Anders Hansson, Klagerup (SE)

(73) Assignee: Sony Ericsson Mobile Communications AB, Lund (SE)

( * ) Notice: Subject to any disclaimer, the term of this patent is extended or adjusted under 35 U.S.C. 154(b) by 466 days.

(21) Appl. No.: 11/930,547

(22) Filed: Oct. 31, 2007

(65) Prior Publication Data
US 2009/0108854 A1    Apr. 30, 2009

(51) Int. Cl.
*G01R 27/08* (2006.01)
*G06F 3/00* (2006.01)

(52) U.S. Cl. ............................ 324/691; 710/15; 710/16
(58) Field of Classification Search ............... 324/691
See application file for complete search history.

(56) References Cited

U.S. PATENT DOCUMENTS

| | | | |
|---|---|---|---|
| 4,792,986 A * | 12/1988 | Garner et al. | 455/90.2 |
| 6,380,748 B1 * | 4/2002 | Kang et al. | 324/645 |
| 6,772,236 B1 * | 8/2004 | Williams et al. | 710/19 |
| 2004/0041911 A1 * | 3/2004 | Odagiri et al. | 348/207.1 |
| 2007/0133828 A1 | 6/2007 | Kanji | |
| 2008/0126583 A1 * | 5/2008 | Mohrmann et al. | 710/7 |
| 2008/0126592 A1 * | 5/2008 | Townsend | 710/16 |

FOREIGN PATENT DOCUMENTS

| | | |
|---|---|---|
| EP | 1 780 903 | 5/2007 |
| GB | 2 429 613 | 2/2007 |

OTHER PUBLICATIONS

International Search Report and Written Opinion for International Application No. PCT/IB08/000990 dated Aug. 6, 2008.
International Preliminary Report on Patentability for International Application No. PCT/IB08/000990 dated Nov. 4, 2009.

* cited by examiner

*Primary Examiner* — Jeff Natalini
(74) *Attorney, Agent, or Firm* — Renner, Otto, Boisselle & Sklar, LLP

(57) ABSTRACT

A device and method for identifying an accessory device connected to a first port and a second port of an electronic device by determining an impedance of the accessory device across the first port and the second port is provided. The electronic device generally includes a first port (e.g. a universal serial bus) configured to receive a first connector from an associated accessory device and a second port (e.g. an audio port) configured to receive a second connector from the associated accessory device. The electronic device includes circuitry coupled to the first port and the second port for determining an impedance associated with the accessory device as measured across the first port and the second port. An identification of the accessory device is then made based on the impedance of the electronic device.

18 Claims, 3 Drawing Sheets

ELECTRONIC DEVICE UTILIZING IMPEDANCE AND/OR RESISTANCE IDENTIFICATION TO IDENTIFY AN ACCESSORY DEVICE

TECHNICAL FIELD OF THE INVENTION

The present invention relates generally to electronic devices that utilize accessory devices for carrying out communication functions and, more particularly, to a device and method for identifying a particular accessory device attached to an electronic device by determining an impedance and/or resistance associated with the accessory device.

DESCRIPTION OF THE RELATED ART

Electronic devices, including computers, mobile and/or wireless electronic devices are becoming increasingly popular. For example, mobile telephones, portable media players and portable gaming devices are now in wide-spread use. In addition, the features and accessories associated with certain types of electronic devices have become increasingly diverse. To name a few examples, many electronic devices have cameras, text messaging capability, Internet browsing capability, electronic mail capability, video playback capability, audio playback capability, image display capability and hands-free headset interfaces. Exemplary accessories may also include headphones, music and video input players, etc.

Many electronic devices include audio connectors to which accessories, such as, for example, handsfree headsets, headphones, etc. may be connected. In addition to audio connectors, it is common many electronic devices to include at least one Universal Serial Bus (USB) connector. Audio connectors and USB connectors for such devices usually include one or more terminals or terminal portions of respective wires or of printed circuit traces, or the like through which electrical signals are conducted between a connector of the mobile phone, for example, and the connector of the accessory device, for example.

Some audio connectors of electronic devices have used five pins or five electrical paths for connection with corresponding pins or electrical paths of the accessory connector of an accessory, and a substantial amount of data, signals, etc. may be transferred via connectors and such connection paths. However, if the number of conductive paths, e.g., the number of pins and/or electrically conductive traces, wires, terminals, etc., were reduced, the amount of data, signals, etc. that could be transferred between the electronic device and accessory may be reduced. For example, a new electrical connector, sometimes referred to as a 3.5 millimeter connector, may have four electrically conductive paths rather than five paths that have been available in other connectors that have been used for similar purposes, e.g., audio signal connection, etc.

Given the limited number of electrically conductive paths from the audio connector and the conventional four or five electrically conductive paths from the USB connector, there are only limited signaling methods available between the electronic device and an attached accessory device. The signaling methods are further reduced when one or more of the pins (e.g., two pins) are dedicated to identifying the type of accessory device to be connected to the electronic device.

One drawback with such practice is that there are only a limited number of connectors on the electrical device and only a limited number of pins on each connector. Thus, the number of pins that could used to provide additional functionality and/or enhance the user's experience (e.g., the user's interaction between the electronic device and the accessory device) are, instead, required to provide accessory identification features. This functionality is further dramatically reduced if audio connector is reduced from five pins to four pins.

SUMMARY

In view of the aforementioned shortcomings, there is a strong need in the art for a system and device capable of identifying a particular accessory utilizing an associated impedance of the accessory device. In particular, there is a strong need for such a system and device which does not require additional connector pins, etc., particularly in an environment in which the number of pins available in a system connector are limited to identify an accessory device and/or electronic device may be configured to function in an optimal manner based on the identification of the accessory device.

One aspect of the invention relates to an electronic device including: a first port configured to receive a first connector from an associated accessory device; a second port configured to receive a second connector from the associated accessory device; and circuitry coupled to the first port and the second port for determining an impedance associated with the associated accessory device as measured across the first port and the second port.

Another aspect of the invention relates to the first port being a universal serial bus port (USB).

Another aspect of the invention relates to the second port being an audio port.

Another aspect of the invention relates to including audio signal processing circuitry for adjusting one or more output signals from the electronic device to the associated accessory device based upon the accessory identification information.

Another aspect of the invention relates to the circuitry supplies an RF excitation signal to the accessory device that is connected to the first port and the second port and detects an impedance and/or resistance based on the extent that the RF excitation signal is transferred to the accessory.

Another aspect of the invention relates to the circuitry measures a standing wave ratio of the RF excitation signal provided to the accessory device in order to detect the extent to which energy from the RF excitation signal is transferred.

Another aspect of the invention relates to the circuitry comprises a standing wave ratio meter.

Another aspect of the invention relates to a memory coupled to the circuitry for storing accessory identification information as function of impedance measured across the first port and the second port.

Another aspect of the invention relates to the circuitry identifies the accessory device that is connected to the first port and the second port from among the accessory identification information stored in memory.

Another aspect of the invention relates to the electronic device being a mobile telephone.

Another aspect of the invention relates to the accessory device is a headset accessory device.

One aspect of the invention relates to a method for identifying an accessory device, the method including: receiving a first connector from an associated accessory device at a first port; receiving a second connector from the associated accessory device at a second port; measuring an impedance corresponding to the associated accessory device as measured across the first port and the second port; and identifying the associated accessory device based upon the measured impedance.

Another aspect of the invention relates to the first port being a universal serial bus port (USB).

Another aspect of the invention relates to the second port being an audio port.

Another aspect of the invention relates to comparing the measured impedance across the first port and second port with one or more values stored in memory to determine an identity associated with the accessory device, wherein the memory accessory identification information as a function of impedance measured across the first port and the second port.

Another aspect of the invention relates to the accessory identification information being stored in a table in the memory.

Another aspect of the invention relates to adjusting an output to the associated accessory device based at least in part on the impedance measured across the first port and the second port.

Another aspect of the invention relates to the step measuring the impedance includes supplying an RF excitation signal to the accessory device that is connected to the first port and the second port and detecting an impedance based on the extent that the RF excitation signal is transferred to the accessory.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
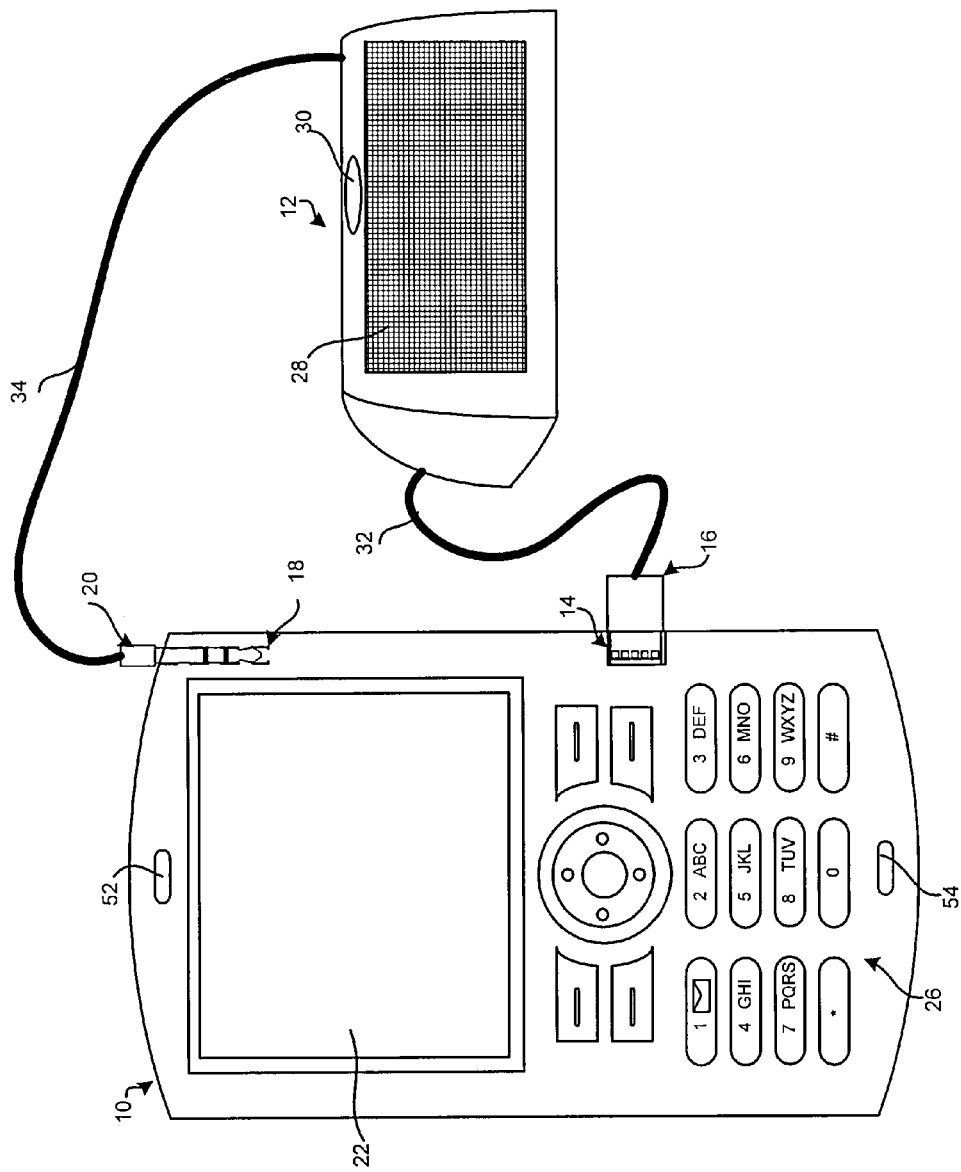
FIG. 1 is a perspective view of an electronic device and an accessory device in accordance with an exemplary embodiment of the present invention.

The present invention is directed to identifying an accessory device connected to a first port and a second port of an electronic device by determining an impedance of the accessory device across the first port and the second port. The electronic device generally includes a first port (e.g. a universal serial bus) configured to receive a first connector from an associated accessory device and a second port (e.g. an audio port) configured to receive a second connector from the associated accessory device. The electronic device includes circuitry coupled to the first port and the second port for determining an impedance associated with the accessory device as measured across the first port and the second port. An identification of the accessory device is then made based on the impedance of the electronic device.

Embodiments of the present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment, personal computers, digital video recorders, digital camcorders, digital cameras, computer peripheral devices, etc.). The term "portable radio communication equipment," which hereinafter is referred to as a "mobile radio terminal," includes all equipment such as mobile telephones, pagers, communicators, electronic organizers, personal digital assistants (PDAs), smart phones, portable communication apparatus, portable gaming devices, portable media devices (video and/or audio), and the like.

In the present application, embodiments of the invention are described primarily in the context of a mobile telephone. However, it will be appreciated that the invention is not intended to be limited to the context of a mobile telephone and may relate to any type of electronic device.

Figure 2:
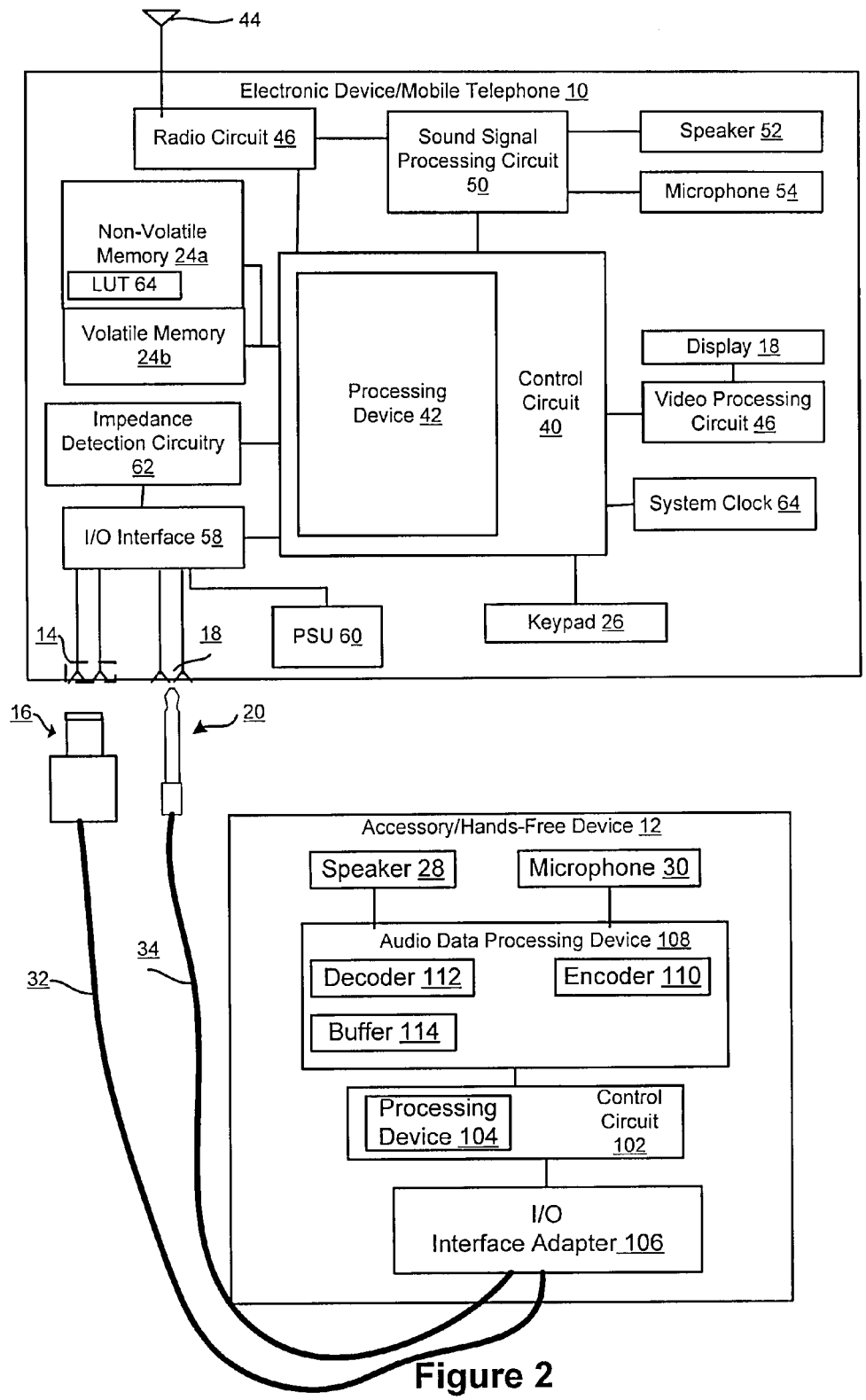
FIG. 2 is a block diagram of electronic device and accessory device of FIG. 1 in accordance with the exemplary embodiment of the present invention.

Referring initially to FIGS. 1 and 2, an electronic device 10 and an accessory device 12 are shown. The term "accessory device" means any device that can be coupled to the electronic device that facilitates use of the electronic device by the user that adds functionality to the mobile device, etc. Exemplary accessory devices include headsets, hands-free headsets, hands-free speakers, user input devices, computer peripherals, and the like.

The electronic device 10 includes a first port 14 for receiving electrical connector 16 for coupling the electronic device 10 with the accessory device 12. As described more fully below, the first port 14 and the electronic connector 16 are generally configured to receive Universal Serial Bus (USB) connectors (e.g., standard USB connectors, mini-USB connectors, micro-USB connectors, etc.). Additionally, the electronic device 10 includes a second port 18 for receiving electrical connector 20 (e.g. an audio connector) for coupling the electronic device 10 with the accessory device 12. As described more fully below, the second port 18 is generally configured to output one or more output signals through the electrical connector 20 to the accessory device 12.

The electronic device 10 of the illustrated embodiment is a mobile telephone and will be referred to as the mobile telephone 10. The mobile telephone 10 is shown as having a brick or block form factor, although other form factors, such as a "flip-open" form factor (e.g., a "clamshell" housing) or a slide-type form factor (e.g., a "slider" housing) also my be utilized.

The mobile telephone 10 may include a display 22. The display 22 displays information to a user such as operating state, time, telephone numbers, contact information, various navigational menus, etc., which enable the user to utilize the various features of the mobile telephone 10. The display 22 also may be used to visually display content received by the mobile telephone 10 and/or retrieved from a memory 24 (FIG. 2) of the mobile telephone 10. The display 22 may be used to present images, video and other graphics to the user, such as photographs, mobile television content and video associated with games.

A keypad 26 provides for a variety of user input operations. For example, the keypad 26 typically includes alphanumeric keys for allowing entry of alphanumeric information such as telephone numbers, phone lists, contact information, notes, etc. In addition, the keypad 26 typically includes special function keys such as a "call send" key for initiating or answering a call, and a "call end" key for ending or "hanging up" a call. Special function keys also may include menu navigation and select keys to facilitate navigating through a menu displayed on the display 22. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone 10 may include a volume key, an audio mute key, an on/off power key, a web browser launch key, a camera key, etc. Keys or key-like functionality also may be embodied as a touch screen associated with the display 22. Also, the display 22 and keypad 26 may be used in conjunction with one another to implement soft key functionality.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc.

The mobile telephone 10 may be configured to transmit, receive and/or process data, such as text messages (e.g., a text message is commonly referred to by some as "an SMS," which stands for short message service), instant messages, electronic mail messages, multimedia messages (e.g., a multimedia message is commonly referred to by some as "an MMS," which stands for multimedia message service), image files, video files, audio files, ring tones, streaming audio, streaming video, data feeds (including podcasts) and so forth. Processing such data may include storing the data in the memory 24, executing applications to allow user interaction with data, displaying video and/or image content associated with the data, outputting audio sounds associated with the data and so forth.

The accessory device 12 illustrated in FIG. 1 may be any desired accessory. For example, the accessory device may be a hands-free accessory (as shown in FIG. 1), the accessory device may be a headset, a keypad, a speaker, a wireless adapter (e.g., IEEE 802.11 communication adapter, infrared adapter, radio frequency identification adapter, near field communication adapter, etc.) to provide increased wireless functionality to the mobile telephone 10, computer, computer peripherals, etc. As shown in FIG. 1, the accessory device 12 is a hands-free accessory that provides a speaker 28 to output audio signals from the mobile telephone 10 and a microphone 30 that captures audio signals and transfers the audio signals to the mobile telephone 10. As is known, a variety of accessory devices oftentimes may be connected to a mobile phone or other electronic device to provide service operations, data communication, added functionality, improved operation, etc. For example, the first port 14 can serve as a means for connecting the mobile phone 10 to a recharger for recharging a battery within the phone 10. The first port 14 also may serve as a means for receiving a data cable (e.g., data cable 32) for transferring data between the mobile phone 10 and accessory device 12.

As shown in FIG. 1, a cable 32 is generally provided to couple the accessory device 12 to the mobile telephone 10 through port 14. In addition, a cable 34 is provided to also couple the accessory device 12 to the mobile telephone 10 through port 18. The cables 32, 34 may be any desirable cable. Preferably, cable 32 has a free end that includes a universal serial bus (USB) connector (e.g., a standard USB connector, a mini-USB connector and/or a micro-USB connector) that matches configuration of port 14. In addition, cable 34 has a free end that includes an audio port connector that matches the configuration of port 18. While specific connector types have been specified for the ports 14, 18, one of ordinary skill in the art will readily appreciate that any type of port with a matching connector may be suitable for carrying out aspects of the present invention.

FIG. 2 represents a functional block diagram of the mobile telephone 10 and the accessory device 12. For the sake of brevity, generally conventional features of the mobile telephone 10 and the accessory device 12 will not be described in great detail herein. The mobile telephone 10 includes a primary control circuit 40 that is configured to carry out overall control of the functions and operations of the mobile telephone 10. The control circuit 40 may include a processing device 42, such as a CPU, microcontroller or microprocessor. The processing device 42 executes code stored in a memory (not shown) within the control circuit 40 and/or in a separate memory, such as the memory 24, in order to carry out operation of the mobile telephone 10.

The memory 24 may include a read only memory area that is implemented using nonvolatile memory 24a, and a random access or system memory area that is implemented using volatile memory 24b. As will be appreciated, nonvolatile memory tends not to lose data storage capability upon loss of power and is typically used to store data, application code, files and so forth. The nonvolatile memory 24a may be implemented with a flash memory, for example. As discussed below, the nonvolatile memory 24a may include a table 64 (also referred to herein as a look-up table (LUT)) that stores accessory identification information in any desired manner. In one embodiment, the table 64 organizes the accessory identification information as a function of impedance of the accessory device.

As will be appreciated, volatile memory tends to lose data storage capability upon loss of power and is typically used to store data for access by the processing device 42 during the execution of logical routines. The volatile memory 24b may be a random access memory (RAM). Data may be exchanged between the nonvolatile memory 24a and the volatile memory 24b as is conventional. The nonvolatile memory 24a and the volatile memory 24b may be sized as is appropriate for the mobile telephone 10 or other electronic device in which the memory 24 is used.

Continuing to refer to FIGS. 1 and 2, the mobile telephone 10 includes an antenna 44 coupled to a radio circuit 46. The radio circuit 46 includes a radio frequency transmitter and receiver for transmitting and receiving signals via the antenna 44 as is conventional. The radio circuit 46 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, DVB-H, ISDB-T, etc., as well as advanced versions of these standards.

The mobile telephone 10 further includes a sound signal processing circuit 50 for processing audio signals transmitted by and received from the radio circuit 46. Coupled to the sound processing circuit 50 are a speaker 52 and a microphone 54 that enable a user to listen and speak via the mobile telephone 10 as is conventional. The radio circuit 46 and sound processing circuit 50 are each coupled to the control circuit 40 so as to carry out overall operation. Audio data may be passed from the control circuit 40 to the sound signal processing circuit 50 for playback to the user. The audio data may include, for example, audio data from an audio file stored by the memory 24 and retrieved by the control circuit 40, or received audio data such as in the form of streaming audio data from a mobile radio service. The sound processing circuit 50 may include any appropriate buffers, decoders, amplifiers and so forth.

The display 22 may be coupled to the control circuit 50 by a video processing circuit 56 that converts video data to a video signal used to drive the display 22. The video processing circuit 56 may include any appropriate buffers, decoders, video data processors and so forth. The video data may be generated by the control circuit 40, retrieved from a video file that is stored in the memory 24, derived from an incoming video data stream that is received by the radio circuit 38 or obtained by any other suitable method.

The mobile telephone 10 may further include one or more I/O interface(s) 58. The I/O interface(s) 58 may be in the form of typical mobile telephone I/O interfaces and may include one or more electrical connectors. As is typical, the I/O interface(s) 58 may be used to couple the mobile telephone 10 to a battery charger to charge a battery of a power supply unit (PSU) 60 within the mobile telephone 10. In addition, or in the alternative, the I/O interface(s) 58 may serve to connect the mobile telephone 10 to an accessory device 12 (e.g., a headset assembly (e.g., a personal hands free (PHF) device)) that has a wired interface with the mobile telephone 10 through port 18 (e.g., an audio connector), as shown in FIGS. 1 and 2. Further, the I/O interface(s) 58 may serve to connect the mobile telephone 10 to an accessory device 12, a personal computer, computer peripheral or any other electronic device through data cable 32 coupled between the port 14 (e.g., a USB connector) and accessory device 12. Additionally, the mobile telephone 10 may receive operating power via the I/O interface(s) 58 when connected to a vehicle power adapter or an electricity outlet power adapter. One of ordinary skill will readily appreciate that schematic of FIG. 2 is exemplary in nature and that a device may be coupled to one or more devices than those identified or, alternatively may not be coupled to a particular device as illustrated. For example, the port 18 (e.g., an audio connector) may be coupled to the sound signal processing circuit 50, instead of or in addition to the I/O Interface circuitry 58.

The mobile telephone 10 also may include impedance detection circuitry 62 that is generally coupled between the first port 14 and the second port 18 and the control circuit 40. The impedance detection circuitry 62 generally measures the impedance between an accessory 12 that is coupled both the first port 14 and the second port 18. While the present invention is described in terms of impedance, one of ordinary skill will readily appreciate that resistance may also be used. Thus, as used herein, the term "impedance" includes the physical property of resistance. The impedance may be measured in any desired manner. For example, once an accessory is connected to the first port 14 and the second port 18, the mobile telephone 10 may automatically attempts to identify the accessory 12 connected to the respective ports based on the measured impedance across the first port 14 and the second port 18.

Generally, the mobile telephone 10 includes conventional impedance determining circuitry. For example, the impedance detection circuitry 62 may include circuitry that supplies an RF excitation signal at different frequencies to the accessory 12 that is connected to the ports 14 and 18. In turn, the impedance detection circuitry 62 detects the extent to which energy from the RF excitation signal is transferred to the accessory device 12 and identifies the accessory device that is connected to the ports 14 and 18 from among accessory devices stored in table 64 stored in memory 24a.

The table 64 generally stores accessory identification information as a function of measured impedance. For example, once the measured impedance is calculated, the calculated value may be used to identify the accessory connected between the ports 14 and 18. Once the accessory device is identified, accessory identification information, which may include one or more configuration settings associated with the accessory device may be accessible and used to configure the interaction of mobile telephone 10 with the accessory device based on the one or more predetermined values stored in the table 64. Exemplary accessory identification information includes, for example, optimal audio settings for the accessory device, device format, device communication protocol, stereo quality, etc. One of ordinary skill in the art will readily appreciate that any desired parameter associated with the accessory device may be stored in the look-up table 64.

The impedance detection circuitry 62 may include a standing wave ratio (SWR) meter that measures the standing wave ratio of the RF excitation signal provided to the accessory device 12. The circuitry 62 may then automatically configure the mobile telephone 10 based on the accessory identification information to optimize performance of the accessory device 12, as used with the specific mobile telephone 10.

The mobile telephone 10 also may include a system clock 64 for clocking the various components of the mobile telephone 10, such as the control circuit 40. The control circuit 40 may, in turn, carry out timing functions, such as timing the durations of calls, generating the content of time and date stamps, and so forth.

Referring now to the exemplary accessory device 12, the accessory device 12 includes a primary control circuit 102 that is configured to carry out overall control of the functions and operations of the accessory device 12. The control circuit 102 may include a processing device 104, such as a CPU, microcontroller or microprocessor. The processing device 104 executes code stored in a memory (not shown) within the control circuit 102 and/or in a separate memory (not shown), in order to carry out operation of the accessory device 12. The memory may be, for example, a buffer, a flash memory, a hard drive, a removable media, a volatile memory and/or a non-volatile memory. In addition, the processing device 104 executes code to carry out various functions of the accessory device 12.

The accessory device 12 includes an input/output interface adapter 106, which is shown coupled to a data cable 32 and an audio output cable 34, each of which having a suitable electrical connector 16, 20, respectively attached on a free end for coupling the accessory device 12 to the mobile telephone 10. The input/output interface adapter 106 generally serves to connect the accessory device 12 with the mobile telephone 10 through one or more ports.

The accessory device 12 further includes an audio data processing device 108 that manages audio data. For example, the audio data processing device 108 may include an encoder 110 that encodes an audio signal received from a microphone 30. Encoded audio data may be transmitted to the mobile telephone 10 for use as part of a telephone call. In addition, the audio data processing device 108 may include a decoder 112 and a data buffer 114 to process audio data received from the mobile telephone 10 and/or one or more devices associated with a network.

The received audio data may be incoming audio data associated with a telephone call. In other situations, the audio data received by the accessory device 12 may be audio (e.g., music, sound, voice, etc.) derived from an audio file played back by the mobile telephone 10. The audio data may be associated with video content displayed on the display 22 of the mobile telephone 10. For example, a video file containing an audio component stored in the memory 24 may be rendered by the mobile telephone 12. In such situations, the video component of the video file or received video signal may be decoded by, for example, the control circuit 40 of the mobile telephone 10 or dedicated video decoder (not shown) to generate a video signal output to the display 22 for viewing. The audio component of the video file or received video signal may be decoded and delivered as an audio signal to the speaker 52 and/or the audio component may be transmitted as audio data to the accessory device 12 for decoding into an audio signal that is broadcast by the speaker 28.

As mentioned above, oftentimes it can be desirable to utilize the ports 14, 18 to connect the mobile phone 10 or other electronic device to various accessory devices each of which may include one or more communication protocols and/or parameters that may be set depending on the characteristics of the accessory device 12. Aspects of the present invention provide an automatic accessory device identification system that enables the mobile phone 10 to identify the particular accessory device 12 connected to the ports 14 and 18. As will be explained in more detail below, the automatic accessory identification method automatically identifies the accessory device based on the impedance measured across the ports 14 and 18.

More particularly, the automatic accessory identification system includes impedance detection circuitry 62 that supplies an RF excitation signal at different frequencies (including 0 Hz) to the accessory device 12 that is connected to the ports 14 and 18 of the mobile telephone 10. In turn, the impedance detection circuitry 62 detects an extent to which energy from the RF excitation signal is transferred to the accessory device 12, and identifies the accessory device 12 that is connected to the ports 14, 18 from among the other accessory devices based on such detection. For example, the circuitry 62 includes a standing wave ratio (SWR) meter that measures the standing wave ratio of the RF excitation signal provided to the accessory device 12. The circuitry 62 may then automatically configure the mobile telephone to interact with the accessory device in a predefined manner. For example, if accessory device is a hands-free device that operates in stereo mode, instead of mono, the mobile telephone 10 may be configured to transmit stereo audio quality to the accessory device 12.

The impedance detection circuitry 62 automatically identifies the accessory device 12 connected to the ports 14, 18. Generally, the ports 14 and 18 receive electrical connectors from the accessory device 12. A signal corresponding to each pin from each of the electrical connectors may be routed to the impedance detection circuitry 62. Based on the detected impedance, the mobile telephone 10 is configured to communicate with the accessory device 12 using one or more values stored in the table 64. For example, if the impedance detected corresponds to an accessory that may utilize stereo data, the mobile telephone 10 may be configured accordingly to stream such data to the accessory device 12. Similarly, if the impedance detected corresponds to an accessory device that is not in the look-up-table, the mobile telephone 10 may automatically be configured to output a lower quality audio signal, which may be compatible with most accessory devices, to the accessory device.

Figure 3:
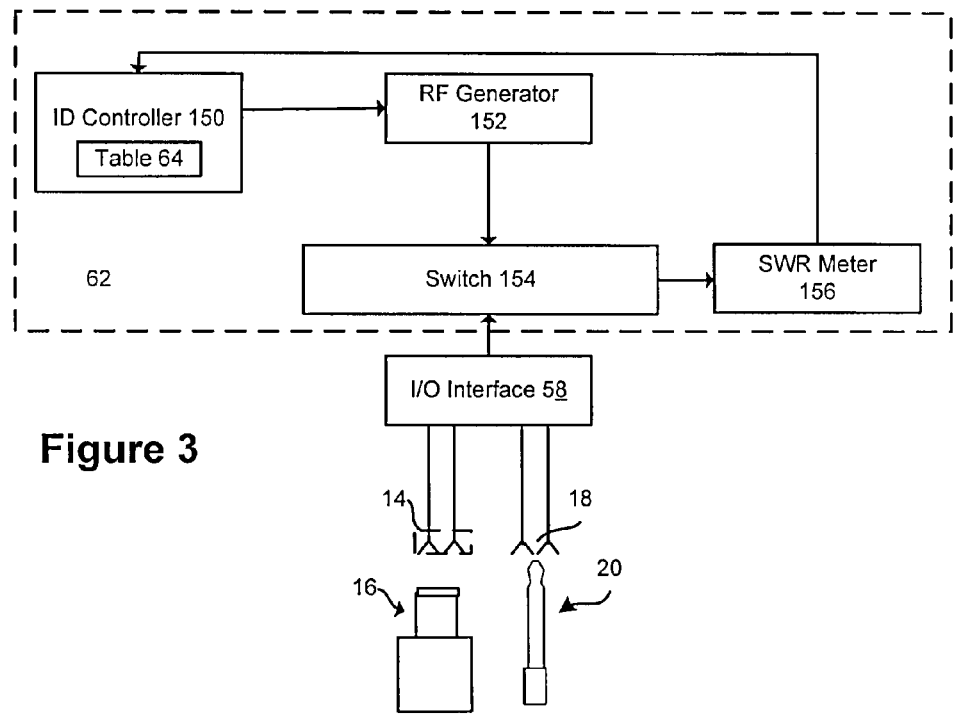
FIG. 3 is an exemplary block diagram impedance detection circuitry of the electronic device of FIG. 1 in accordance with the exemplary embodiment of the present invention.

Turning now to FIG. 3, the impedance detection circuitry 62 is illustrated in more detail. The circuitry 62 includes an identification controller 150 configured to carry out the various automatic accessory identification and configuration control operations described herein. As will be appreciated, the identification controller 150 may be separate from the control circuit 40. Alternatively, the identification controller 150 may simply be part of the control circuit 40 without departing from the scope of the invention.

The system 50 further includes an RF generator 152 that generates RF excitation signals that are provided to the particular accessory device 12 connected to the system ports 14 and 18. The RF generator 152 may include multiple generators fixed in frequency, a variable frequency generator, or a combination thereof. For purposes of the present invention, it is simply desirable that a source for RF excitation signals be provided, regardless of whether the source is separate or apart from the other RF circuit(s).

In the exemplary embodiment, the impedance detection circuitry 62 includes a switch 154. The switch 154 is customizable to address any combination of pins input to the switch. For example since the electrical connector 16 to port 14 may be a USB connector, there may be four or five pins associated with the connector 16. Likewise, since the audio connector 20 may include 2, 3, or 4 addressable pins, it may be necessary to address one or more combinations of the signals available at the two ports. The switch 154 may logically connect any combination of pins received from the first and/or second ports (e.g., ports 14 and 18).

Also illustrated in the exemplary embodiment is an SWR meter 156. As is know, the SWR meter measures the standing wave ratio along a transmission line. By positioning the SWR meter 156 close to the switch 154, the SWR meter 156 will produce an output indicative of the SWR of the accessory device 12 connected to the ports 14, 18.

Referring again to the identification controller 150 may have a table comparable to table 64 stored internally in the controller 150. Such a table identifies one or more predefined accessory devices 12 based upon impedance values. Alternatively, identification controller 150 may utilize the table 64 stored in memory 24a The table 64 identifies one or more predefined accessory devices 12 that are suitable to be utilized with the mobile phone 10 along with the corresponding identification information based upon measured impedance between the two connected ports of the electronic device 10. Such identification may correspond to communication protocol, encoding protocol, adjustable audio parameters, etc. The table 64 generally identifies accessory devices based on the impedance detected across ports 14 and 18. For example, the table 64 may appear as follows:

| Impedance Value | Device Type | Decoding Scheme | Encoding Scheme |
|---|---|---|---|
| 104 Ω | Headset | MP3 | MP3 |
| 154 Ω | Headset | AAC | AAC |
| 500 Ω | Speaker | AAC | NA |
| 1.5K Ω | Headset | AAC | AAC |

Note: the values listed on table are exemplary in nature and are not directed to any particular device and/or format. Any identification information deemed useful may be stored in a suitable table format.

Figure 4:
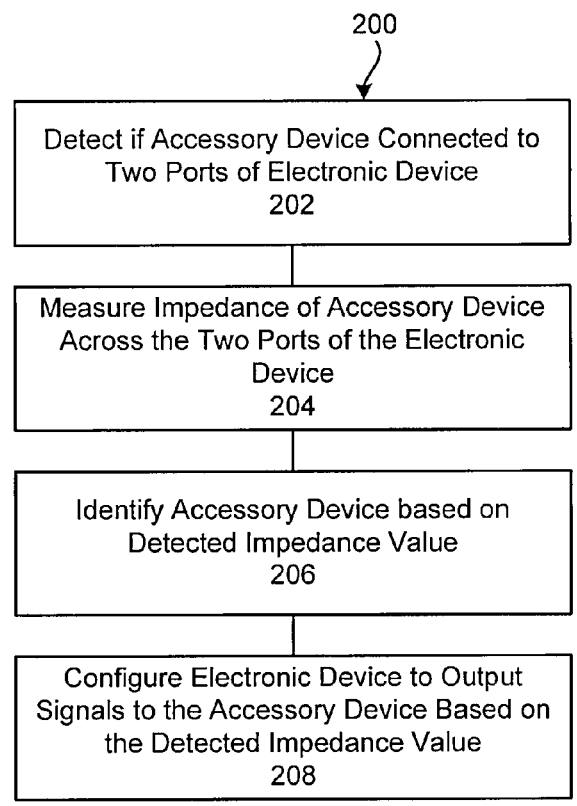
FIG. 4 is a flowchart representing operation of the automatic accessory identification and configuration circuit in accordance with the exemplary embodiment of the present invention.

A method 200 of automatic accessory identification and configuration will now be described in conjunction with the flow chart of FIG. 4. Beginning at step 202, the impedance detection circuitry 62 determines if an accessory device 12 has been connected to the ports 14, 18. This can be done using any of a variety of known techniques. For example, each of the ports 14, 18 may include a microswitch that indicates whether another connector has been connected to the ports. Alternatively, sensing a change in impedance between the ports (14, 18) may indicate a connector is attached to each of the ports 14, 18. If a connector is attached to only one port, the impedance between the two ports (14 and 18) is presumably very high, which would not indicate an accessory is connected to the first port 14 and second port 18.

Provided it is determined in step 202 that an accessory device 12 is connected to ports 14 and 18, the system proceeds to step 202 in which the impedance detection circuitry 62 measures the impedance of the accessory device 12 between the first and second ports (e.g., ports 14 and 18). The impedance of the accessory device may be measured with respect to any and/or all combinations of pins available at the respective first port 14 and second port 18 and at any desired frequency (including 0 Hz). The impedance detection circuitry 62 may utilize any method to determine the impedance of the accessory device 12 connected to the first port 14 and the second port 18.

At step 204, once the impedance of the accessory device 12 is measured, the measured value is compared to values stored in the table 64. If the measured value corresponds a value in the table 64, the accessory device 12 is identified.

At step 206, the mobile telephone 10 is configured to output signals to the associated accessory device based at least in part on the impedance measured across the first port and the second port.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Likewise, while particular method steps have been recited in a particular order, the method steps may occur in any desired order and fall within the scope of the present invention.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electronic device comprising:
a first port configured to receive a first cable connector from an associated accessory device;
a second port configured to receive a second cable connector from the associated accessory device, wherein the first cable connector and the second cable connector are coupled to separate cables; and
circuitry coupled to the first port and the second port for determining an impedance and/or resistance associated with the associated accessory device as measured across the first port and the second port, wherein measured impedance and/or resistance is used as accessory identification information to identify the associated accessory device.

2. The electronic device of claim 1, wherein the first port is a universal serial bus port (USB).

3. The electronic device of claim 2, wherein the second port is an audio port.

4. The electronic device of claim 1 further including audio signal processing circuitry for adjusting one or more output signals from the electronic device to the associated accessory device based upon the accessory identification information.

5. The electronic device of claim 1, wherein the circuitry supplies an RF excitation signal to the accessory device that is connected to the first port and the second port and detects an impedance and/or resistance based on the extent that the RF excitation signal is transferred to the associated accessory device.

6. The electronic device of claim 5, wherein the circuitry measures a standing wave ratio of the RF excitation signal provided to the accessory device in order to detect the extent to which energy from the RF excitation signal is transferred.

7. The electronic device of claim 6, wherein the circuitry comprises a standing wave ratio meter.

8. The electronic device of claim 1 further including a memory coupled to the circuitry for storing accessory identification information as function of impedance measured across the first port and the second port.

9. The electronic device of claim 8, wherein the circuitry identifies the accessory device that is connected to the first port and the second port from among the accessory identification information stored in memory.

10. The electronic device of claim 1, wherein the electronic device is a mobile telephone.

11. The electronic device of claim 1, wherein the accessory device is a headset accessory device.

12. A method for identifying an accessory device, the method comprising:
receiving a first cable connector from an associated accessory device at a first port;
receiving a second cable connector from the associated accessory device at a second port, wherein the first cable connector and the second cable connector are coupled to separate cables;
measuring an impedance and/or resistance corresponding to the associated accessory device as measured across the first port and the second port; and
identifying the associated accessory device based upon the measured impedance and/or resistance.

13. The method of claim 12, wherein the first port is universal serial bus port (USB).

14. The method of claim 13, wherein the second port is an audio port.

15. The method of claim 14 further including comparing the measured impedance across the first port and second port with memory accessory identification information stored in memory to determine an identity associated with the accessory device, wherein the memory accessory identification information is stored as a function of impedance measured across the first port and the second port.

16. The method of claim 15, wherein the accessory identification information is stored in a table in the memory.

17. The method of claim 12 further including adjusting an output to the associated accessory device based at least in part on the impedance measured across the first port and the second port.

18. The method of claim 12, wherein the step of measuring the impedance includes supplying an RF excitation signal to the accessory device that is connected to the first port and the second port and detecting an impedance based on the extent that the RF excitation signal is transferred to the accessory.

* * * * *